United States Patent
Otaka et al.

(10) Patent No.: US 8,920,894 B2
(45) Date of Patent: Dec. 30, 2014

(54) RUBBER-RESIN LAMINATE

(75) Inventors: Toyofumi Otaka, Osaka (JP); Koushiro Hamaguchi, Osaka (JP); Yoritaka Yasuda, Osaka (JP); Taro Ozaki, Osaka (JP)

(73) Assignee: Daiso Co., Ltd., Osaka (JP)

( * ) Notice: Subject to any disclaimer, the term of this patent is extended or adjusted under 35 U.S.C. 154(b) by 468 days.

(21) Appl. No.: 13/376,171

(22) PCT Filed: Jun. 1, 2010

(86) PCT No.: PCT/JP2010/059260
§ 371 (c)(1),
(2), (4) Date: Feb. 24, 2012

(87) PCT Pub. No.: WO2010/140583
PCT Pub. Date: Dec. 9, 2010

(65) Prior Publication Data
US 2012/0141712 A1    Jun. 7, 2012

(30) Foreign Application Priority Data
Jun. 5, 2009  (JP) ................................. 2009-136247

(51) Int. Cl.
| | |
|---|---|
| B32B 1/08 | (2006.01) |
| B32B 25/08 | (2006.01) |
| B32B 27/38 | (2006.01) |
| B32B 27/30 | (2006.01) |
| B32B 25/14 | (2006.01) |
| B32B 7/10 | (2006.01) |
| C08L 71/03 | (2006.01) |
| B32B 27/36 | (2006.01) |
| C08L 19/00 | (2006.01) |
| C08L 63/00 | (2006.01) |
| C08K 5/3415 | (2006.01) |
| C08K 3/22 | (2006.01) |
| C08K 3/26 | (2006.01) |

(52) U.S. Cl.
CPC ............... *B32B 25/08* (2013.01); *C08K 5/3415* (2013.01); *B32B 27/306* (2013.01); *B32B 1/08* (2013.01); *B32B 25/14* (2013.01); *B32B 7/10* (2013.01); *B32B 2307/7244* (2013.01); *C08K 3/22* (2013.01); *C08L 71/03* (2013.01); *C08K 3/26* (2013.01); *B32B 27/36* (2013.01); *B32B 2597/00* (2013.01)
USPC ..... 428/36.91; 428/35.7; 428/36.6; 428/36.8; 428/413; 428/475.5; 428/480; 428/500

(58) Field of Classification Search
None
See application file for complete search history.

(56) References Cited

U.S. PATENT DOCUMENTS

| | | | |
|---|---|---|---|
| 2003/0087053 A1 | 5/2003 | Fukushi | |
| 2004/0253403 A1* | 12/2004 | Ainsworth | ................. 428/36.91 |
| 2005/0059763 A1 | 3/2005 | Beck | |
| 2009/0000684 A1 | 1/2009 | Shinoda et al. | |
| 2009/0000685 A1 | 1/2009 | Shinoda et al. | |

FOREIGN PATENT DOCUMENTS

| | | |
|---|---|---|
| JP | 8-294998 A | 11/1996 |
| JP | 2005-503947 A | 2/2005 |
| JP | 2005-53130 A | 3/2005 |
| JP | 2006-44201 A | 2/2006 |
| JP | 2009-6574 A | 1/2009 |
| JP | 2009-6575 A | 1/2009 |
| JP | 2009-56632 A | 3/2009 |

OTHER PUBLICATIONS

Technical Information for Dyneon Fluorothermoplastics (no date).*
Office Action issued Nov. 21, 2013 in corresponding Chinese patent application No. 201080024847.3.
Extended Search Report issued Jul. 5, 2013 in corresponding European Application No. 10783366.7.

* cited by examiner

*Primary Examiner* — Michael J Feely
(74) *Attorney, Agent, or Firm* — Knobbe Martens Olson & Bear LLP

(57) ABSTRACT

Disclosed is a vulcanized rubber laminate, wherein a thermoplastic resin layer and an unvulcanized epichlorohydrin rubber composition layer containing a specific maleimide compound, vulcanizing agent, and acid acceptor are heated and bonded. Specifically disclosed is a laminate configured by heating and bonding an unvulcanized epichlorohydrin rubber composition layer (A) and a thermoplastic resin (B), wherein the unvulcanized epichlorohydrin rubber composition contains: an epichlorohydrin rubber (a), a compound containing one or more maleimide group within the molecule (b), a vulcanizing agent (c), and an acid acceptor (d).

11 Claims, No Drawings

RUBBER-RESIN LAMINATE

CROSS-REFERENCE TO RELATED APPLICATIONS

This application is the U.S. National Phase under 35. U.S.C. §371 of International Application PCT/JP2010/059260, filed Jun. 1, 2010, which claims priority to Japanese Patent Application No. 2009-136247, filed Jun. 5, 2009. The International Application was published under PCT Article 21(2) in a language other than English.

TECHNICAL FIELD

The present invention relates to a rubber-resin laminate. More particularly, the present invention relates to a vulcanized rubber laminate in which an unvulcanized epichlorohydrin-based rubber composition layer containing a maleimide compound, an acid acceptor and a vulcanizing agent, and a thermoplastic resin layer are heated and bonded, and thus, both rubber layers are firmly bonded.

BACKGROUND ART

Regulation of a hydrocarbon-based transpiration gas emitted from an automotive fuel system has recently become very severe mainly in USA, and a progress has been made in the development of fuel-based rubber hoses with various constitutions coping with the regulation. Particularly, there have been deviced and used various rubber hoses in which a fuel-resistant barrier resin is arranged as a barrier layer and a rubber material is laminated to the fuel-resistant barrier resin as an inner layer and/or an outer layer so as to ensure fuel permeation resistance, flexibility and the like.

For example, there has been commonly used a hose having a structure in which a fluororesin is used as a barrier layer, and a fluororubber (FKM), an epichlorohydrin rubber (ECO), an acrylonitrilebutadiene rubber (NBR), chlorosulfonated polyethylene (CSM), chlorinated polyethylene and the like are laminated as an inner layer and/or an outer layer.

Patent Document 1 discloses that adhesiveness is improved by mixing, as an epichlorohydrin-based rubber composition, a specific adhesive activator in a rubber laminate of a fluororesin and an epichlorohydrin-based rubber. However, in the above fluororesin-rubber laminate hose, the fluororesin of the barrier layer is very expensive and it was necessary to increase a wall thickness of the barrier layer and increase the content of fluorine in order to improve fuel permeation resistance. Such a method had a drawback that the hose itself becomes hard and it becomes difficult to process.

Therefore, there have been proposed various methods in which a barrier layer is formed using a resin having excellent fuel permeation resistance other than the fluororesin. Patent Documents 2, 3 and 4 disclose the constitution of a multi-layered hose in which a thermoplastic resin having excellent fuel barrier properties is used, and Patent Document 4 discloses a method of bonding a thermoplastic resin layer having excellent fuel barrier properties and a rubber layer.

However, it is commonly known that dissimilar polymer materials are poor in adhesiveness to each other. In case of the above multi-layered hose, adhesiveness between these dissimilar materials is the most important subject and various methods have been proposed so as to improve the adhesiveness. However, sufficient adhesive strength is not obtained between the thermoplastic resin having excellent fuel barrier properties and the epichlorohydrin-based rubber, and it is necessary to mix a large amount of adhesive activator so as to firmly bond them. Thus, the multi-layered hose is not yet in practical use and a rubber-thermoplastic resin laminate having higher adhesiveness is required.

Patent Document 1: JP-A-8-294998
Patent Document 2: JP-A-2009-6574
Patent Document 3: JP-A-2009-6575
Patent Document 4: JP-A-2005-503947

An object of the present invention is to provide a rubber-thermoplastic resin laminate having a sufficient adhesive strength by vulcanizing and bonding a thermoplastic resin having excellent fuel barrier properties and an epichlorohydrin-based rubber.

Means for Solving the Problems

The present inventors have found that it is possible to obtain a vulcanized rubber laminate in which an unvulcanized epichlorohydrin-based rubber composition layer containing a maleimide compound, a vulcanizing agent and an acid acceptor, and a thermoplastic resin layer are firmly bonded by being heated and bonded, and thus have completed the present invention.

That is, the present invention provides a laminate in which (A) an unvulcanized epichlorohydrin-based rubber composition layer and (B) a thermoplastic resin layer are heated and bonded,
wherein the unvulcanized epichlorohydrin-based rubber composition (A) contains the following (a) to (d):
(a) an epichlorohydrin-based rubber,
(b) a compound having one or more maleimide groups in the molecule,
(c) a vulcanizing agent, and
(d) an acid acceptor.

In the present invention, the mixing amount of the compound having one or more maleimide groups in the molecule (b) is preferably from 0.1 to 10 parts by weight based on 100 parts by weight of the epichlorohydrin-based rubber (a); and the compound having one or more maleimide groups in the molecule (b) is preferably at least one kind selected from maleimide, 1,2-bis(maleimide)ethane, 1,6-bismaleimidehexane, 3-maleimidepropionic acid, 4,4'-bismaleimidediphenylmethane, bis(3-ethyl-5-methyl-4-maleimidephenyl)methane, N,N'-1,3-phenylenedimaleimide, N,N'-1,4-phenylenedimaleimide, N-(1-pyrenyl)maleimide, N-(2,4,6-trichlorophenyl)maleimide, N-(4-aminophenyl)maleimide, N-(4-nitrophenyl)maleimide, N-benzylmaleimide, N-bromomethyl-2,3-dichloromaleimide, N-cyclohexylmaleimide, N-ethylmaleimide, N-methylmaleimide, N-phenylmaleimide, N-succinimidyl 3-maleimidebenzoate, N-succinimidyl 3-maleimidepropionate, N-succinimidyl 4-maleimidebutyrate, N-succinimidyl 6-maleimidehexanoate and N-[4-(2-benzoimidazolyl)phenyl]maleimide, and more preferably at least one kind selected from maleimide, 1,6-bismaleimidehexane, 4,4'-bismaleimidediphenylmethane, N,N'-1,3-phenylenedimaleimide, N,N'-1,4-phenylenedimaleimide, N-benzylmaleimide and N-phenylmaleimide.

In the present invention, the vulcanizing agent (c) is preferably selected from quinoxaline-based vulcanizing agents, thiourea-based vulcanizing agents, triazine-based vulcanizing agents and bisphenol-based vulcanizing agents, and more preferably selected from quinoxaline-based vulcanizing agents including 2,3-dimercaptoquinoxaline, quinoxaline-2,3-dithiocarbonate, 6-methylquinoxaline-2,3-dithiocarbonate and 5,8-dimethylquinoxaline-2,3-dithiocarbonate, thiourea-based vulcanizing agents including 2-mercaptoimidazoline (ethylenethiourea), 1,3-diethylthiourea, 1,3-dibutylthiourea and trimethylthiourea, triazine-based vulcanizing agents including 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine and 1-phenylamino-3,5-dimercaptotriazine, and bisphenol-based vulcanizing agents including bisphenol AF and bisphenol S.

In the present invention, the acid acceptor (d) is preferably a metal compound and/or an inorganic microporous crystal, and more preferably a synthetic hydrotalcite which is one inorganic microporous crystal.

In the present invention, the thermoplastic resin layer (B) is preferably selected from a polyvinylidene chloride resin, a polyvinyl alcohol resin, an ethylene-vinyl alcohol copolymer resin, a nylon resin, a polyacrylonitrile resin, a polyester resin and a polybutylene naphthalate resin, and is particularly preferably an ethylene-vinyl alcohol copolymer resin or a polybutylene naphthalate resin. An oxygen permeation rate of the thermoplastic resin layer (B) of the present invention is preferably 500 cc·20 µm/m²·day·atm or less.

In the present invention, a laminate hose is preferably produced using the above laminate.

Effect of the Invention

The vulcanized rubber-resin laminate obtained by the present invention is very excellent in adhesiveness between both vulcanized rubbers and an adhesive surface is firm. Thus, the laminate is extremely useful for such applications that one surface is exposed to the environment which requires gasoline permeation resistance or the like, and the other surface is exposed to the environment which requires aging resistance, weatherability and gasoline resistance or the like, for example, fuel hoses and filler hoses.

MODE FOR CARRYING OUT THE INVENTION

Hereinafter, the present invention will be described in detail.

Firstly, the unvulcanized epichlorohydrin-based rubber composition (A) of the present invention will be described in detail. The unvulcanized epichlorohydrin-based rubber composition (A) contains at least an epichlorohydrin-based rubber, a compound having one or more maleimide groups in the molecule, a vulcanizing agent and an acid acceptor.

Examples of the epichlorohydrin-based rubber in the unvulcanized epichlorohydrin-based rubber composition (A) of the present invention include, an epichlorohydrin homopolymer, an epichlorohydrin-alkylene oxide copolymer such as an epichlorohydrin-ethylene oxide copolymer, an epichlorohydrin-propylene oxide copolymer, an epichlorohydrin-ethylene oxide-allyl glycidyl ether multicomponent-copolymer such as an epichlorohydrin-ethylene oxide-allyl glycidyl ether terpolymer and an epichlorohydrin-ethylene oxide-propylene oxide-allyl glycidyl ether quadripolymer. Among these rubbers, an epichlorohydrin homopolymer, an epichlorohydrin-ethylene oxide copolymer and an epichlorohydrin-ethylene oxide-allyl glycidyl ether terpolymer are preferable, and an epichlorohydrin-ethylene oxide copolymer and an epichlorohy drin-ethylene oxide-allyl glycidyl ether terpolymer are more preferable.

In the case of an epichlorohydrin-ethylene oxide copolymer and an epichlorohydrin-ethylene oxide-allyl glycidyl ether terpolymer, for example, the copolymerization proportion of epichlorohydrin is preferably from 5 mol % to 95 mol %, more preferably from 10 mol % to 75 mol %, and still more preferably from 10 mol % to 65 mol %. The copolymerization proportion of ethylene oxide is preferably from 5 mol % to 95 mol %, more preferably from 25 mol % to 90 mol %, and still more preferably from 35 mol % to 90 mol %. The copolymerization proportion of allyl glycidyl ether is preferably from 0 mol % to 10 mol %, more preferably from 1 mol % to 8 mol %, and still more preferably from 1 mol % to 7 mol %. Although there is no particular limitation on molecular weight of these homopolymer or copolymers, they usually have Mooney viscosity $ML_{1+4}$ (100° C.) of about 30 to about 150.

Specific examples of the compound having one or more maleimide groups in the molecule (b) in the unvulcanized epichlorohydrin-based rubber composition (A) include maleimide, 1,2-bis(maleimide)ethane, 1,6-bismaleimidehexane, 3-maleimidepropionic acid, 4,4'-bismaleimidediphenylmethane, bis(3-ethyl-5-methyl-4-maleimidephenyl)methane, N,N'-1,3-phenylenedimaleimide, N,N'-1,4-phenylenedimaleimide, N-(1-pyrenyl)maleimide, N-(2,4,6-trichlorophenyl)maleimide, N-(4-aminophenyl)maleimide, N-(4-nitrophenyl)maleimide, N-benzylmaleimide, N-bromomethyl-2,3-dichloromaleimide, N-cyclohexylmaleimide, N-ethylmaleimide, N-methylmaleimide, N-phenylmaleimide, N-succinimidyl 3-maleimidebenzoate, N-succinimidyl 3-maleimidepropionate, N-succinimidyl 4-maleimidebutyrate, N-succinimidyl 6-maleimidehexanoate, and N-[4-(2-benzoimidazolyl)phenyl]maleimide, preferably maleimide, 1,6-bismaleimidehexane, 4,4'-bismaleimidediphenylmethane, N,N'-1,3-phenylenedimaleimide, N,N'-1,4-phenylenedimaleimide, N-benzylmaleimide and N-phenylmaleimide, and more preferably maleimide and N,N'-1,3-phenylenedimaleimide.

The mixing amount of the compound having one or more maleimide groups in the molecule (b) is preferably from 0.1 to 10 parts by weight, and more preferably from 0.1 to 5 parts by weight, based on 100 parts by weight of the epichlorohydrin-based rubber (a). The mixing amount is preferably within the above range since sufficient adhesiveness between the vulcanized epichlorohydrin-based rubber composition layer and the thermoplastic resin layer can be obtained without causing a decrease in elastic modulus of the rubber.

As the vulcanizing agent (c) used in the present invention, at least one kind selected from the group consisting of a quinoxaline-based vulcanizing agent, a thiourea-based vulcanizing agent, a triazine-based vulcanizing agent and a bisphenol-based vulcanizing agent is used.

Examples of the quinoxaline-based vulcanizing agent include 2,3-dimercaptoquinoxaline, quinoxaline-2,3-dithiocarbonate, 6-methylquinoxaline-2,3-dithiocarbonate and 5,8-dimethylquinoxaline-2,3-dithiocarbonate, and preferably 6-methylquinoxaline-2,3-dithiocarbonate.

Examples of the thiourea-based vulcanizing agent include 2-mercaptoimidazoline(ethylenethiourea), 1,3-diethylthiourea, 1,3-dibutylthiourea, and trimethylthiourea, and 2-mercaptoimidazoline(ethylenethiourea) is preferable.

Examples of the triazine-based vulcanizing agent include 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine and 1-phenylamino-3,5-dimercaptotriazine, and 2,4,6-trimercapto-1,3,5-triazine is preferable.

Examples of the bisphenol-based vulcanizing agent include bisphenol AF and bisphenol S.

Two or more kinds of these vulcanizing agents may be used in combination as long as the effects of the present invention are not adversely affected.

The mixing amount of the vulcanizing agent is from 0.1 to 10 parts by weight, and preferably from 0.3 to 5 parts by weight, based on 100 parts by weight of the epichlorohydrin-based rubber (a). The mixing amount is preferably within the above range since sufficient crosslinking is achieved and a vulcanized product does not become too rigid, and usually expected physical properties of the vulcanized epichlorohydrin-based rubber are obtained.

A metal compound and/or an inorganic microporous crystal are/is used as the acid acceptor (d) used in the present invention. Examples of the metal compound include oxides, hydroxides, carbonates, carboxylates, silicates, borates and phosphites of metals of Group II of the Periodic Table, and oxides, basic carbonates, basic carboxylates, basic phosphites, basic sulfites and tribasic sulfates of metals of Group IVA of the Periodic Table.

Specific examples of the metal compound used as the acid acceptor include magnesia, magnesium hydroxide, barium hydroxide, magnesium carbonate, barium carbonate, sodium carbonate, lime, slaked lime, calcium carbonate, calcium silicate, calcium stearate, zinc stearate, calcium phthalate, calcium phosphite, zinc white, tin oxide, litharge, red lead, white lead, bibasic lead phthalate, bibasic lead carbonate, basic lead silicate, tin stearate, basic lead phosphite, basic tin phosphite, basic lead sulfite and tribasic lead sulfate. Particularly preferred acid acceptors include magnesia, calcium carbonate, slaked lime, lime and sodium carbonate.

The inorganic microporous crystal means a porous crystalline material which can be distinguished clearly from porous amorphous materials such as silica gel and alumina. Examples of the inorganic microporous crystal include zeolites, an aluminophosphate type molecular sieve, a layered silicate, a synthetic hydrotalcite and an alkaline metal titanate salt. The acid acceptor is particularly preferably a synthetic hydrotalcite.

Examples of the zeolites include natural zeolites, A-, X-, or Y-type synthetic zeolites, sodalites, natural or synthetic mordenites, ZSM-5, and metal-substituted derivatives thereof, and they may be used alone, or two or more kinds thereof may be used in combination. The metal of the metal-substituted derivative is generally sodium. The zeolites preferably have a large acid acceptability, and are preferably an A-type zeolite.

The synthetic hydrotalcite is represented by the following general formula (1):

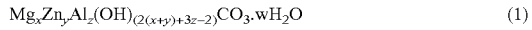

$$Mg_xZn_yAl_z(OH)_{2(x+y)+3z-2}CO_3 \cdot wH_2O \tag{1}$$

wherein x and y are real numbers satisfying the relation of x+y=1 to 10, z is a real number of 1 to 5, and w is a real number of 0 to 10.

Examples of the hydrotalcites represented by the general formula (1) include $MG_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot 3.5H_2O$ and $Mg_3ZnAl_2(OH)_{12}CO_3$.

The amount of the acid acceptor to be added is preferably from 0.2 to 50 parts by weight, more preferably from 0.5 to 50 parts by weight, and particularly from 1 to 20 parts by weight, based on 100 parts by weight of the epichlorohydrin-based rubber. When the amount is less than the above range, sufficient crosslinking cannot be achieved. In contrast, when the amount is more than the above range, the vulcanized product may become too rigid to obtain usually desired physical properties of the vulcanized epichlorohydrin-based rubber.

In the present invention, known vulcanization accelerators and retarders, which are usually used in combination with these vulcanizing agents, can be used.

Examples of the vulcanization accelerator include sulfur, morpholine sulfides, amines, salts of weak acid of amine, basic silica, quaternary ammonium salts, quaternary phosphonium salts, alkali metal salts of fatty acid, thiuram sulfides, polyfunctional vinyl compounds, mercaptobenzothiazoles, sulfenamides and dithiocarbamates. Examples of particularly preferable accelerator when the quinoxaline-based vulcanizing agent is applied to the composition of the present invention include 1,8-diazabicyclo(5,4,0)undecene-7 (hereinafter abbreviated to DBU) salts, 1,5-diazabicyclo(4,3,0)nonene-5 (hereinafter abbreviated to DBN) salts, basic silica, and alkali metal salts of fatty acid.

Examples of the DBU salts include DBU carbonates, DBU-stearates, DBU-2-ethylhexanates, DBU-benzoates, DBU-salicylates, DBU-3-hydroxy-2-naphthoates, DBU-phenol resin salts, DBU-2-mercaptobenzothiazole salts and DBU-2-mercapto benzimidazole salts. Examples of the DBN salts include DBN-carbonates, DBN-stearates, DBN-2-ethylhexanates, DBN-benzoates, DBN-salicylates, DBN-3-hydroxy-2-naphthoates, DBN-phenol resin salts, DBN-2-mercaptobenzothiazole salts and DBN-2-mercaptobenzimidazole salts. When these DBU salts and/or DBN salts are used as accelerators, the amount of them to be added are preferably from 0.1 to 5 parts by weight, and more preferably from 0.5 to 3 parts by weight, based on 100 parts by weight of the epichlorohydrin-based rubber.

The basic silica is silica containing sodium with a pH of 9 to 13 and, when the basic silica is used as the accelerator, the amount thereof is preferably from 2 to 30 parts by weight, and more preferably from 5 to 20 parts by weight, based on 100 parts by weight of the epichlorohydrin-based rubber.

Examples of the alkali metal salts (preferably sodium salts or potassium salts) of fatty acid include alkali metal salts of higher fatty acid, resin acid and naphthenic acid, and alkali metal salts of higher fatty acid having 6 or more carbon atoms are more preferable. Specific examples thereof include sodium salts and potassium salts of semihardened beef tallow fatty acid, stearic acid, oleic acid, sebacic acid and castrol oil. Examples of preferable salt include semihardened beef tallow fatty acid sodium salts, sodium stearate, semihardened beef tallow fatty acid potassium salts and potassium stearate, and sodium stearate and/or potassium stearate are more preferable. In particular, sodium salts such as semihardened beef tallow fatty acid sodium salts and sodium stearate are preferably used because storage stability is satisfactory. When these alkali metal salts of fatty acid are used as the accelerator, the amount thereof is preferably from 0.2 to 10 parts by weight, and more preferably from 0.5 to 7 parts by weight, based on 100 parts by weight of the epichlorohydrin-based rubber.

Examples of the retarders include N-cyclohexylthiophthalimide, phthalic anhydride, an organic zinc compound and acidic silica. The amount of the retarder to be added is preferably from 0 to 10 parts by weight, and more preferably from 0.1 to 5 parts by weight, based on 100 parts by weight of the epichlorohydrin-based rubber(a).

It is possible to optionally mix the unvulcanized epichlorohydrin-based rubber composition (A) used in the present invention with various mixing agents which are used commonly in the relevant field, such as antioxidants, fillers, reinforcing agents, plasticizers, processing aids, pigments and flame retardants.

Secondly, the thermoplastic resin (B) of the present invention will be described in detail.

A resin called a barrier material is usually used as the thermoplastic resin (B). Specific examples thereof include a polyvinylidene chloride resin, a polyvinyl alcohol resin, an ethylene-vinyl alcohol copolymer resin, a nylon resin, a polyacrylonitrile resin, and a polyester resin. Also, a resin, which is not called the barrier material, is sometimes used while being laminated with these materials. Furthermore, those obtained by vapor-depositing a resin, which is not the barrier material, with aluminum, silica, alumina and the like may be sometimes used. Also, a resin, which is not the barrier material, may be sometimes used in the form of a drawn film.

The thermoplastic resin (B) of the present invention is preferably a thermoplastic resin having an oxygen permeation rate of 500 cc·20 $\mu m/m^2$·day·atm or less, and more preferably a thermoplastic resin having an oxygen permeation rate of 100 cc·20 $\mu m/m^2$·day·atm or less.

Furthermore, examples of preferable thermoplastic resin include an ethylene-vinyl alcohol copolymer resin and a polybutylene naphthalate resin.

Examples of the method of producing the laminate in the present invention include a method in which both compositions are laminated by co-extrusion molding or sequential extrusion molding and then heat-vulcanized or heat vulcanization-molded, or a method in which lamination of both rubber compositions and heat vulcanization molding using a mold are carried out at the same time. It is also possible to employ a method in which one of the rubber compositions is heat-vulcanized slightly so as to keep a desired shape, and then both rubber compositions are laminated and sufficiently heat vulcanization-molded. Examples of the method of heat vulcanizing molding the laminate laminated by the above extrusion molding include molding using a mold. It is possible to optionally employ, as the method of heat vulcanizing, a known method using a steam can, an air bath, an infrared ray, a microwave, lead sheathing vulcanization and the like. In the vulcanization, the heating temperature is usually from 100 to 200° C., and the heating time may be selected depending on the temperature and is usually from 0.5 to 300 minutes.

Typical examples of the aspect when the laminate of the present invention is applied to fuel oil hoses include two-layered hoses having an inner layer of the fluororubber and an outer layer of the epichlorohydrin-based rubber, three-layered hose having a braided reinforcing layer on the outer layers, and four-layered hose further having a rubber layer thereon. Examples of the aspect further include a three-layered hose including a rubber layer formed as an innermost layer taking sealability with a connecting pipe into consideration, a thermoplastic resin layer which is formed outside thereof, and a rubber layer which is further formed outside thereof; a four-layered hose including a braided reinforcing layer which is further formed outside thereof; and a five-layered hose including a rubber layer which is further formed outside thereof. There may be usually used, as the braided material used for the above three-, four- or five-layered hose, braided materials such as a polyester fiber, a polyamide fiber, a glass fiber, a vinylon fiber and cotton. There may be usually used, as the material of the outermost rubber layer used for the above four- or five-layered hose, a synthetic rubber having aging resistance, weatherability, oil resistance and the like, such as, in addition to an epichlorohydrin-based rubber, an ethylene-acrylate rubber, a chloroprene rubber, a chlorinated polyethylene rubber or chlorosulfonated polyethylene.

The present invention will be described below with reference to Examples as typical examples without intention of restricting the scope of the invention.

Examples 1 to 8, Comparative Examples 1 to 6

Epichlorohydrin-based rubber compositions shown in Tables 1 and 2 were kneaded with a kneader and an open roll to obtain a sheet (i) having a thickness of 2 to 2.5 mm. On the other hand, a thermoplastic resin shown in Table 3 was pressed at a temperature of a melting point thereof or higher to prepare a sheet (ii) having a thickness of 0.2 to 0.3 mm. As shown in Table 4, Table 5 and Table 6, the above sheets (i) and (ii) were stuck to each other and pressurized at 160° C. under 20 to 25 kg/cm$^2$ for 30 minutes to obtain a vulcanized rubber laminate having a thickness of 2.2 to 2.8 mm. Adhesiveness was evaluated by the following method.

The obtained laminate was cut into a strip measuring 1.0× 10 cm to prepare an adhesiveness test sample. The sample was subjected to T-peel test at 25° C. at a peeling rate of 50 mm/min, and then the peel strength (kN/m) was measured. The peeling state was visually observed. Evaluation criteria are shown below and the evaluation results are shown in Table 4, Table 5 and Table 6.

Excellent (⊚): Layers were firmly bonded, and rubber breaking was caused therebetween.

Good (○): Peeling strength was relatively good, while rubber breaking was not caused.

Poor (×): Layers were not bonded at all, and peeling was caused at boundary.

Components used in Examples and Comparative Examples are as follows.

1: "Epichlorohydrin-ethylene oxide comopolymer (mole ratio 49:51)" manufactured by Daiso Co., Ltd.

2: "DHT-4A" manufactured by Kyowa Chemical Industry Co., Ltd.

3: "P-152" manufactured by Daiso Co., Ltd.

4: "Daisonet XL-21S" manufactured by Daiso Co., Ltd.

5: "DynamarRC5251Q" manufactured by 3M

6: "DynamarFC5157" manufactured by 3M

7: "DynamarFC5166" manufactured by 3M

8 "EVAL F1018", manufactured by Kuraray Co., Ltd.

9 "PBN TQB-OT", manufactured by Teijin Chemicals Ltd.

TABLE 1

| Mixing components (unit: parts by weight) | Mixing No. | | | | |
|---|---|---|---|---|---|
| | No. 1 | No. 2 | No. 3 | No. 4 | No. 5 |
| ECH/EO copolymer rubber *1 | 100 | 100 | 100 | 100 | 100 |
| FEF carbon (reinforcing agent) | 50 | 50 | 50 | 50 | 50 |
| Di(butoxyethoxy)ethyl adipate (plasticizer) | 10 | 10 | 10 | 10 | 10 |
| Sorbitan monostearate (lubricant) | 3 | 3 | 3 | 3 | 3 |
| Nickel dibutyldithiocarbamate (antioxidant) | 1 | 1 | 1 | 1 | 1 |
| Copper dimethylthiocarbamate (antioxidant) | 0.1 | 0.1 | 0.1 | 0.1 | 0.1 |
| Synthetic hydrotalcite (acid acceptor) *2 | 3 | 3 | 3 | 3 | 3 |
| Magnesium oxide (acid acceptor) | 3 | 3 | 3 | 3 | 3 |
| Phenol resin salt of DBU (accelerator) *3 | 1 | 1 | 1 | 1 | 1 |
| N,N'-1,3-phenylenebismaleimide | 2 | 3 | | | |
| Maleimide | | | 3 | | |
| Maleic anhydride | | | | | 3 |
| N-cyclohexylthiophthalimide (retarder) | 1 | 1 | 1 | 1 | 1 |
| 6-methylquinoxaline-2,3-dithiocaronate(vulcanizing agent) *4 | 1.7 | 1.7 | 1.7 | 1.7 | 1.7 |

TABLE 2

| Mixing components (unit: parts by weight) | Mixing No. | | | |
|---|---|---|---|---|
| | No. 6 | No. 7 | No. 8 | No. 9 |
| ECH/EO copolymer rubber *1 | 100 | 100 | 100 | 100 |
| FEF carbon (reinforcing agent) | 50 | 50 | 50 | 50 |
| Di(butoxyethoxy)ethyl adipate (plasticizer) | 10 | 10 | 10 | 10 |
| Sorbitan monostearate (lubricant) | 3 | 3 | 3 | 3 |
| Nickel dibutyldithiocarbamate (antioxidant) | 1 | 1 | 1 | 1 |
| Copper dimethylthiocarbamate (antioxidant) | 0.1 | 0.1 | 0.1 | 0.1 |
| Magnesium oxide (acid acceptor) | 3 | 3 | | |
| Sodium carbonate (acid receptor) *5 | | | 10 | 10 |
| N,N'-1,3-phenylenebismaleimide | 3 | | 3 | |
| N-cyclohexylthiophthalimide (retarder) | 1 | 1 | | |
| Tetramethylthiuram monosulfide | 0.5 | 0.5 | | |
| 2,4,6-trimercapto-s-triazine (vulcanizing agent) | 1 | 1 | | |
| Quaternary phosphonium salt (accelerator) *6 | | | 1 | 1 |
| Bisphenol S (vulcanizing agent) *7 | | | 2 | 2 |

TABLE 3

| | Name of resin |
|---|---|
| Thermoplastic resin (A) *8 | Ethylene-vinyl alcohol copolymer resin |
| Thermoplastic resin (B) *9 | Polybutylene naphthalate resin |

TABLE 4

| | Example 1 | Example 2 | Example 3 | Comparative Example 1 | Comparative Example 2 |
|---|---|---|---|---|---|
| Epichlorohydrin layer (sheet (i)) Mixing No. | No. 1 | No. 2 | No. 3 | No. 4 | No. 5 |
| Thermoplastic resin layer (sheet (ii)) | A | A | A | A | A |
| Peeling strength (kN/m) | 1.8 | 8.3 | 8.5 | Unmeasurable | Unmeasurable |
| Peeling state | Good | Excellent | Excellent | Bad | Bad |

Evaluation results of adhesiveness between both vulcanized rubbers of Examples 1 to 3, and Comparative Examples 1 and 2.

TABLE 5

| | Example 4 | Example 5 | Example 6 | Comparative Example 3 | Comparative Example 4 |
|---|---|---|---|---|---|
| Epichlorohydrin layer (sheet (i)) Mixing No. | No. 1 | No. 2 | No. 3 | No. 4 | No. 5 |
| Thermoplastic resin layer (sheet (ii)) | B | B | B | B | B |
| Peeling strength (kN/m) | 2.2 | 8.2 | 7.5 | Unmeasurable | Unmeasurable |
| Peeling state | Good | Excellent | Excellent | Bad | Bad |

Evaluation results of adhesiveness between both vulcanized rubbers of Examples 4 to 6, and Comparative Examples 3 and 4.

TABLE 6

| | Example 7 | Comparative Example 5 | Example 8 | Comparative Example 6 |
|---|---|---|---|---|
| Epichlorohydrin layer (sheet (i)) Mixing No. | No. 6 | No. 7 | No. 8 | No. 9 |
| Thermoplastic resin layer (sheet (ii)) | A | A | A | A |
| Peeling strength (kN/m) | 8.3 | Unmeasurable | 7.9 | Unmeasurable |
| Peeling state | Excellent | Bad | Excellent | Bad |

Evaluation results of adhesiveness between both vulcanized rubbers of Examples 7 and 8, and Comparative Examples 5 and 6.

Laminates of Examples 1 to 6 in Tables 4 and 5 are laminates which contain a quinoxaline-based vulcanizing agent as a vulcanizing agent, and also contain a compound having one or more maleimide groups in the molecule. Laminates of Comparative Examples 1 and 3 are laminates which do not contain a compound having a maleimide group, and laminates of Comparative Examples 2 and 4 are laminates which contain maleic anhydride as an adhesive activator. Laminates of Examples 7 and 8 are laminates in which the vulcanizing agent is changed, and laminates of Comparative Examples 5 and 6 are laminates which do not contain the compound having a maleimide group of Examples 5 to 7. In any case, laminates containing the compound having one or more maleimide groups in the molecule exhibit satisfactory adhesiveness, and laminates which do not contain the same were not bonded at all.

INDUSTRIAL APPLICABILITY

The rubber-resin laminate of the present invention has the above-mentioned constitution, so that the laminate is very excellent in adhesiveness between both layers and an adhesive surface is firm. Thus, the laminate is extremely useful for such applications that one surface is exposed to the environment which requires gasoline permeation resistance or the like, and the other surface is exposed to the environment which requires aging resistance, weatherability and gasoline resistance or the like, for example, fuel hoses and filler hoses.

The invention claimed is:

1. A laminate comprising (A) an unvulcanized epichlorohydrin-based rubber composition layer and (B) a thermoplastic resin layer,
    wherein (A) the unvulcanized epichlorohydrin-based rubber composition and (B) the thermoplastic resin layer are heated to bond them together and to vulcanize (A) the unvulcanized epichlorohydrin-based rubber composition, and
    the unvulcanized epichlorohydrin-based rubber composition (A) contains the following (a) to (d):
    (a) an epichlorohydrin-based rubber,
    (b) a compound having one or more maleimide groups in the molecule,
    (c) a vulcanizing agent, said vulcanizing agent (c) containing at least one kind of a vulcanizing agent selected from a quinoxaline-based vulcanizing agent a thiourea-based vulcanizing agent, a triazine-based vulcanizing agent and a bisphenol-based vulcanizing agent, and
    (d) an acid acceptor.

2. The laminate according to claim 1, wherein the mixing amount of the compound having one or more maleimide groups in the molecule (b) is from 0.1 to 10 parts by weight based on 100 parts by weight of the epichlorohydrin-based rubber (a).

3. The laminate according to claim 1, wherein the compound having one or more maleimide groups in the molecule (b) is at least one kind selected from maleimide, 1,2-bis(maleimide)ethane, 1,6-bismaleimidehexane, 3-maleimidepropionic acid, 4,4'-bismaleimidediphenylmethane, bis(3-ethyl-5-methyl-4-maleimidephenyl)methane, N,N'-1,3-phenylenedimaleimide, N,N'-1,4-phenylenedimaleimide, N-(1-pyrenyl)maleimide, N-(2,4,6-trichlorophenyl)maleimide, N-(4-aminophenyl)maleimide, N-(4-nitrophenyl)maleimide, N-benzylmaleimide, N-bromomethyl-2,3-dichloromaleimide, N-cyclohexylmaleimide, N-ethylmaleimide, N-methylmaleimide, N-phenylmaleimide, N-succinimidyl 3-maleimidebenzoate, N-succinimidyl 3-maleimidepropionate, N-succinimidyl 4-maleimidebutyrate, N-succinimidyl 6-maleimidehexanoate and N-[4-(2-benzoimidazolyl)phenyl]maleimide.

4. The laminate according to claim 1, wherein the compound having one or more maleimide groups in the molecule (b) is at least one kind selected from maleimide, 1,6-bismaleimidehexane, 4,4'-bismaleimidediphenylmethane, N,N'-1,3-phenylenedimaleimide, N,N'-1,4-phenylenedimaleimide, N-benzylmaleimide and N-phenylmaleimide.

5. The laminate according to claim 1, wherein
the quinoxaline-based vulcanizing agent comprises at least one member selected form the group consisting of 2,3-dimercaptoquinoxaline, quinoxaline-2,3-dithiocarbonate, 6-methylquinoxaline-2,3-dithiocarbonate and 5,8-dimethylquinoxaline-2,3-dithiocarbonate,
thiourea-based vulcanizing agent comprises at least one member selected form the group consisting of 2-mercaptoimidazoline(ethylenethiourea), 1,3-diethylthiourea, 1,3-dibutylthiourea and trimethylthiourea,
triazine-based vulcanizing agent comprises at least one member selected form the group consisting of 2,4,6-trimercapto-1,3,5-triazine, 1-hexylamino-3,5-dimercaptotriazine, 1-diethylamino-3,5-dimercaptotriazine, 1-cyclohexylamino-3,5-dimercaptotriazine, 1-dibutylamino-3,5-dimercaptotriazine, 2-anilino-4,6-dimercaptotriazine and 1-phenylamino-3,5-dimercaptotriazine, and
bisphenol-based vulcanizing agent comprises at least one member selected form the group consisting of bisphenol AF and bisphenol S.

6. The laminate according to claim 1, wherein the acid acceptor (d) is a metal compound and/or an inorganic microporous crystal.

7. The laminate according to claim 1, wherein the acid acceptor (d) is a synthetic hydrotalcite.

8. The laminate according to claim 1, wherein an oxygen permeation rate of the thermoplastic resin layer (B) is 500 cc·20 μm/m²·day·atm or less.

9. The laminate according to claim 1, wherein the thermoplastic resin layer (B) is at least one kind selected from a polyvinylidene chloride resin, a polyvinyl alcohol resin, an ethylene-vinyl alcohol copolymer resin, a nylon resin, a polyacrylonitrile resin, a polyester resin and a polybutylene naphthalate resin.

10. The laminate according to claim 1, wherein the thermoplastic resin layer (B) is made of an ethylene-vinyl alcohol copolymer resin or a polybutylene naphthalate resin.

11. A laminate hose using formed from the laminate according to claim 1.

* * * * *